United States Patent [19]

Finkenbeiner

[11] Patent Number: 5,085,382

[45] Date of Patent: * Feb. 4, 1992

[54] DEVICE FOR INTERCEPTING AND RETAINING CARGO IN A TRANSPORT SPACE

[75] Inventor: Robert Finkenbeiner, Harpstedt, Fed. Rep. of Germany

[73] Assignee: Deutsche Airbus Gesellschaft mit beschraenkter Haftung, Hamburg, Fed. Rep. of Germany

[*] Notice: The portion of the term of this patent subsequent to Sep. 18, 2007 has been disclaimed.

[21] Appl. No.: 390,621

[22] Filed: Aug. 7, 1989

[30] Foreign Application Priority Data

Aug. 11, 1988 [DE] Fed. Rep. of Germany ....... 3827279

[51] Int. Cl.$^5$ ............................................. B64D 1/10
[52] U.S. Cl. ................................. 244/118.1; 244/121; 188/371; 267/64.27
[58] Field of Search ............................ 244/118.1, 121; 188/371, 377; 267/64.27, 35

[56] References Cited

U.S. PATENT DOCUMENTS

| | | | |
|---|---|---|---|
| 2,669,402 | 2/1954 | Del Mar | 244/118.1 X |
| 2,949,841 | 8/1960 | Richardson | 244/118.1 X |
| 3,423,121 | 1/1969 | Lipkin | 244/121 X |
| 3,437,367 | 4/1969 | Blank | 188/371 X |
| 3,575,786 | 4/1971 | Baker et al. | 244/121 X |
| 3,603,535 | 9/1971 | DePolo | 244/121 |
| 3,741,504 | 6/1973 | Alberti et al. | 244/118.1 X |
| 4,535,017 | 8/1985 | Kuckein et al. | 244/121 X |
| 4,732,803 | 3/1988 | Smith, Jr. | 244/121 |
| 4,957,250 | 9/1990 | Hararat-Tehrani | 244/118.1 |

FOREIGN PATENT DOCUMENTS 2649991 5/1978 Fed. Rep. of Germany .
2913050 10/1980 Fed. Rep. of Germany .

Primary Examiner—Brian S. Steinberger
Attorney, Agent, or Firm—W. G. Fasse; D. H. Kane, Jr.

[57] ABSTRACT

A device for separating a space for cargo in a vehicle, for example in an aircraft cabin or compartment, is constructed for keeping pieces of cargo, for example baggage, in place and to even intercept cargo pieces that may have gotten loose. Such a structure is secured to the vehicle, e.g. an aircraft body, by ceiling brackets and floor mountings. The wall itself is a multilayer structure with different layers provided for different purposes. At least one layer or strut structure is arranged for taking up impact energy effective in a direction in which impact forces are effective, primarily in the travel direction of the vehicle.

13 Claims, 5 Drawing Sheets

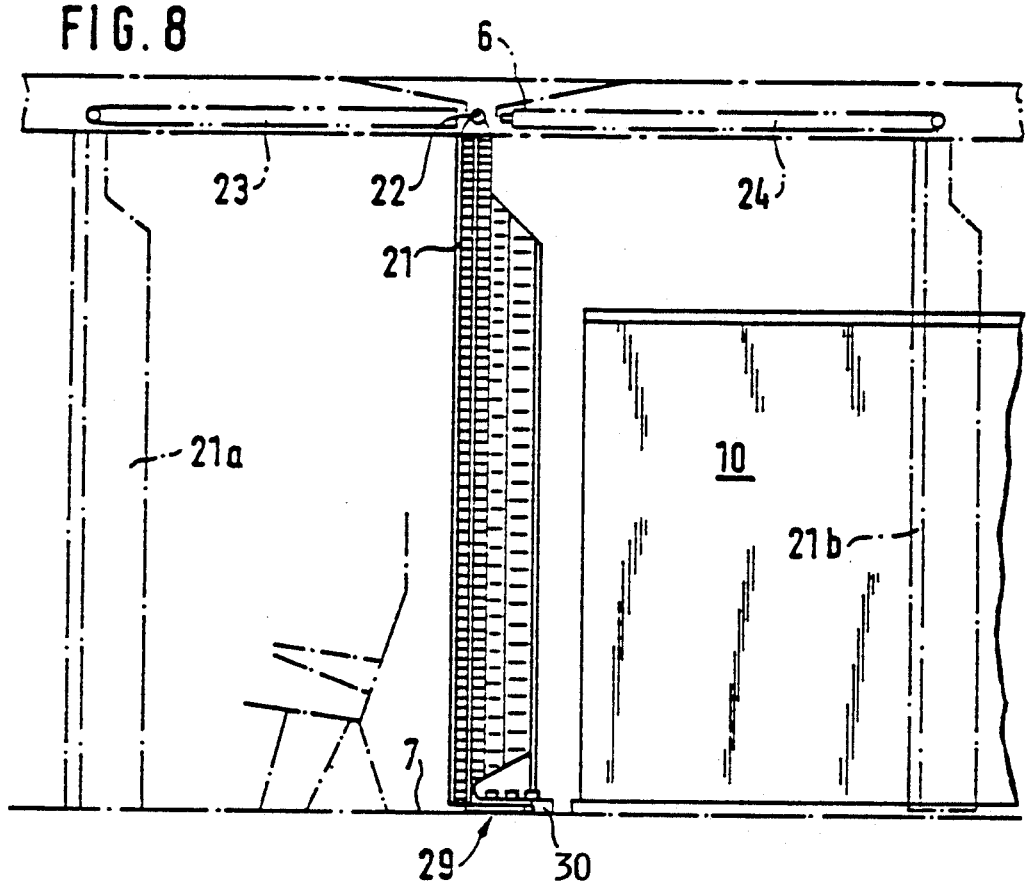
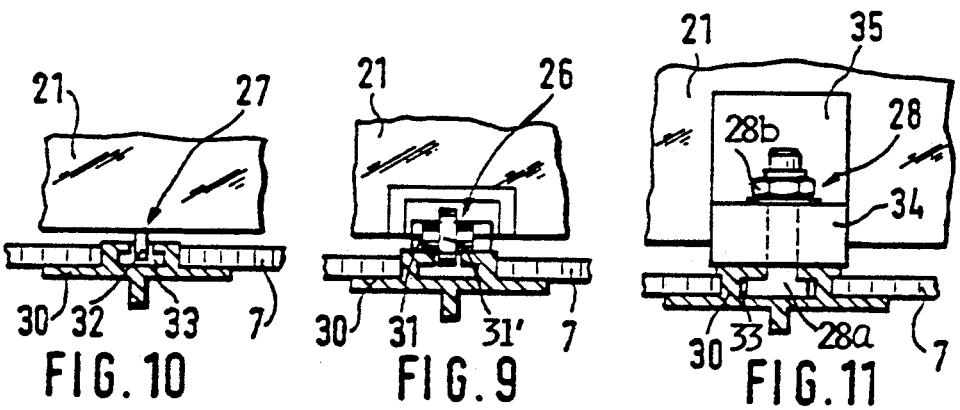
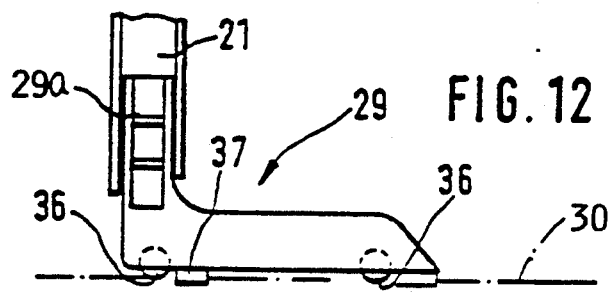

5,085,382

DEVICE FOR INTERCEPTING AND RETAINING CARGO IN A TRANSPORT SPACE

FIELD OF THE INVENTION

The invention relates to a device for intercepting and retaining cargo in a transport space. More specifically, the present device is intended for separating a space for cargo in a vehicle and for retaining the cargo in the separated space. Such a device is, for example, needed in an aircraft cabin in which a portion of the passenger space is to be set aside for holding baggage.

BACKGROUND INFORMATION

Conventional separating walls, for example, in aircraft cabins, are arranged between a cargo space or compartment and a passenger cabin. Such a separating wall is conventionally secured to the aircraft structure such as the fuselage by brackets securing the top portion of the separating wall to the cabin ceiling and the bottom portion to the cabin floor.

German Patent Publication (DE-OS) 2,649,991 discloses partition walls for vehicles, which walls are to a limited extent movable in the longitudinal vehicle direction. Arresting devices are provided for securing the partition walls in a number of different positions. The end wall of a cargo space so separated from the rest of the vehicle, is braced against the vehicle end wall by means of shock absorbers.

German Patent Publication (DE-OS) 2,913,050 discloses a device constructed to be arranged between the cockpit of an aircraft and a freight space or cargo hold in such aircraft for intercepting pieces of cargo. The known device comprises a net which is arranged in a vertical position when it is in its operational condition. Thus, when the aircraft is in horizontal flight, the net takes up a vertical plane in the aircraft body. Elastically expandable belts secure the net to the aircraft structure, whereby releaseable hardware is used for removing the net if desired. Such a structure requires a relatively large free space behind the net in order to intercept loads. The free space must correspond substantially to the flexible yielding of the net and the flexible yielding or stretching of the mounting belts. As a result, the cabin space remaining for passengers is substantially reduced.

OBJECTS OF THE INVENTION

In view of the above it is the aim of the invention to achieve the following objects singly or in combination:

to provide a device for separating a space for cargo in a vehicle, especially in an aircraft cabin, and for intercepting and retaining pieces of cargo in said space, whereby the device itself shall take up as little space as possible without any need for a free space to enable the device to stretch;

to construct the separating device or wall in such a way that it can take up acceleration energy by yielding to impact energy only to a minimal extent; and to construct the separation wall in a lightweight manner to achieve a substantial weight reduction as compared to conventional structures of this type.

SUMMARY OF THE INVENTION

According to the invention the protective separation wall is characterized by a multilayer structure, the individual layers of which are connected to each other, for example, by an adhesive bonding to provide an integral wall structure comprising means for taking up energy in the force introducing direction which normally is the flight direction.

Advantages achieved by the invention are seen in that, due to the energy take-up abilities of at least one layer or ply in the layered structure, it is now possible to construct the connecting means or attachment means which secure the separating wall to the vehicle, such as the ceiling and floor in an aircraft cabin, with dimensions that are substantially smaller or weaker so that the respective brackets and other connecting hardware provide a substantial weight reduction. Another advantage is seen in that the wall itself requires relatively little space yet is easily adaptable to the space requirements of any particular aircraft type, for example, with regard to the cell structure of the aircraft fuselage. A free space behind the present separating wall is no longer necessary since an elastic yielding is minimized. Thus, the present wall could, for example, be arranged immediately behind the cockpit, thereby intruding into the passenger space as little as possible when separating a freight space from the passenger cabin.

Compared to the conventional elastically yielding net structure the present separating device can retain even smaller pieces of luggage which heretofore had a tendency to slip through the net so to speak.

Additionally, the present device is suitable for use in a cargo space below the floor of an aircraft and for use in a passenger cabin above the floor of such an aircraft. The device is fully capable of protecting passengers from luggage that may have become loose. Further, the present device can be used to separate, for example, a portion of the cabin for other purposes, for example, to form different rooms in the aircraft cabin such as a resting room for flight attendants or the like. Generally, the present device is suitable for use as partition walls in any type of aircraft requiring adjustable or permanent floor layouts.

BRIEF DESCRIPTION OF THE DRAWINGS

In order that the invention may be clearly understood, it will now be described, by way of example, with reference to the accompanying drawings, wherein:

FIG. 8 is a view in a direction similar to that of FIG. 1, illustrating three different positions in which the present partition wall could be arranged inside an aircraft cabin;

FIG. 9 is a sectional view through a guide rail in the floor of an aircraft cabin illustrating an adjustable means for securing or supporting the wall on the aircraft floor;

FIG. 10 is a view similar to that of FIG. 9, but illustrating a sliding keel which rides along the rail or rather in a rail channel for guiding the wall in a position adjustable manner;

FIG. 11 is a sectional view similar to that of FIG. 9, but illustrating a modified position adjustable means for securing the wall to the floor and for tightening the position adjustable means when the wall has assumed an adjusted position;

FIG. 12 is a side view of a mounting bracket for securing the wall to the floor again in a position adjustable manner;

DETAILED DESCRIPTION OF PREFERRED EXAMPLE EMBODIMENTS AND OF THE BEST MODE OF THE INVENTION

Figure 1:
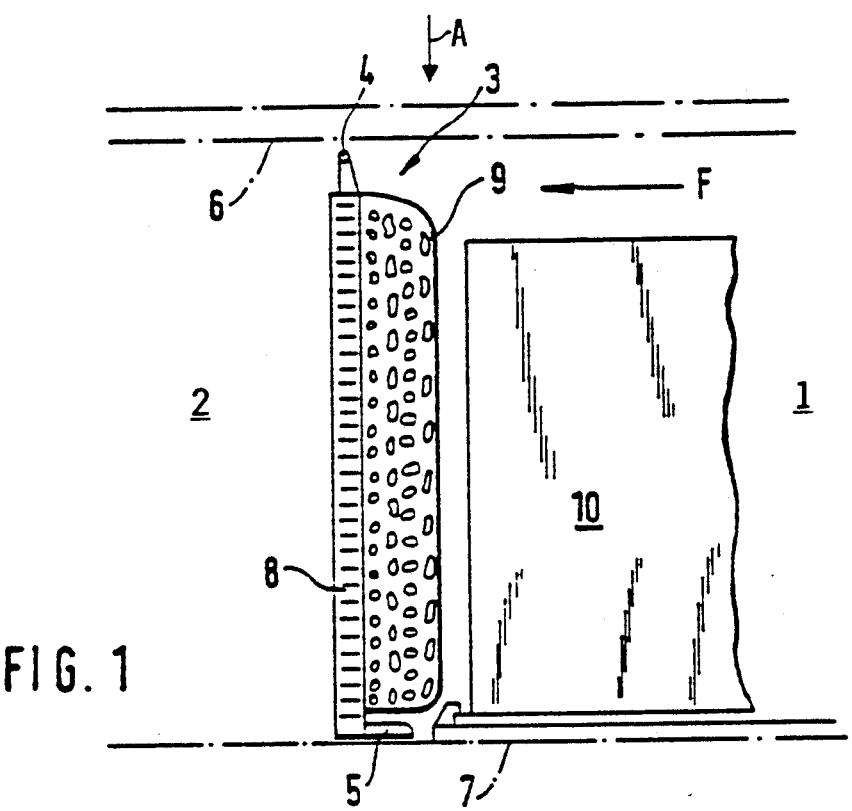
FIG. 1 shows a side view perpendicularly to the longitudinal axis of a vehicle such as an aircraft illustrating a partition wall structure according to the invention.

Referring to FIG. 1, a partition wall 3 according to the invention separates a freight space 1 from a passenger cabin 2 in an aircraft intended to travel in the direction indicated by the arrow F. The partition wall 3 in FIG. 1 comprises a multilayer structure secured by a fixed bracket 4 to the ceiling structure 6 of the aircraft and by a further bracket 5 to the floor structure 7 of the aircraft. The bracket 5 may be a position adjustable device for securing or at least supporting the partition wall 3 on the floor. The layers or panels forming the wall structure of the partition wall 3 are bonded to each other and to a base wall to form an integral wall structure. At least one of the layers has an energy of an impact absorbing characteristic so that it is able to take up or absorb energy applied to the partition wall by a piece of cargo 10 moving in the direction of the arrow F.

In the embodiment of FIG. 1, the partition wall 3 comprises a base wall 8 made, of a fiber composite material for example, reinforced with carbon fibers providing the necessary strength while a foam material layer or block 9 is intimately bonded to the base wall 8. The foam layer or block 9 is an integral foam having large cells. The foam is bonded to the fiber composite material, for example, as a result of the curing of the fiber composite material and/or of the foam.

Figure 2:
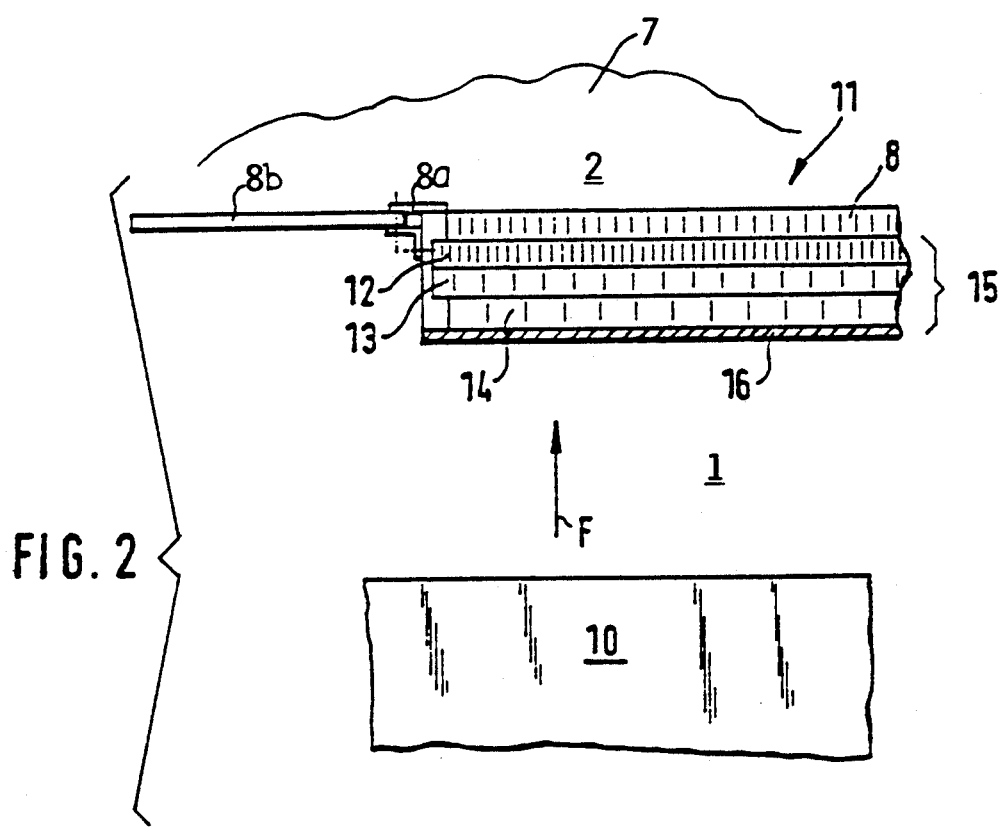
FIG. 2 illustrates a view in the direction of the arrow A in FIG. 1, partially in section, illustrating the multilayer structure forming a partition wall including a base wall made of fiber composite material and a plurality of layers of honeycomb cell blocks arranged in front of the base wall as viewed in the axial direction in which a cargo piece could move when the vehicle is decelerated.

Although FIG. 2 is a view substantially in the direction of the arrow A in FIG. 1, the partition wall 11 in FIG. 2 has a somewhat different construction compared to the construction illustrated in FIG. 1. In FIG. 2 the wall again comprises the base wall 8 carrying brackets 8a pivoted to rods 8b to be secured to the aircraft cabin structure, not shown in FIG. 2. The wall 11 of FIG. 2 has a layered structure 15 comprising, for example, three layers 12, 13, and 14 laminated to one another. The layers 12, 13, and 14 are, for example, made of aluminum honeycomb cell blocks bonded to each other by an adhesive and carrying on the face toward the cargo 10 a protective outer metal ply 16 forming a cover also adhesively bonded to the honeycomb structure of the cell block 14. The outer metal ply 16 is, for example, also made of aluminum which has a relatively low tensile strength. Thus, the cover ply 16 can buckle.

The different spacings between the vertical lines in the layers 12, 13, and 14 are intended to indicate honeycomb cells of different cell dimensions. Thus, the layers 12, 13, and 14 also have different densities. For example, the layer 14 has the least density and the density increases toward the base wall 8. In another embodiment or modification similar to that shown in FIG. 2 the partition wall is constructed of resin impregnated paper honeycomb cores sandwiched between fiber composite material plies, for example, fiber composite plies reinforced by carbon fibers. In other words, the base wall 8 would still be a fiber composite material and the aluminum honeycomb layers (15) would be replaced by resin impregnated paper honeycomb cores. The outer cover ply 16 is made of fiber composite material layer and an outer layer facing the cargo 10 would be the same as the foam layer or block 9 in FIG. 1. Such an integral foam material block could also have several layers with different characteristics, for example, with increasing densities away from the cargo to provide increasing strength characteristics. The foam block would have a closed cover surface, e.g. formed by the cover ply 16.

Figure 3:
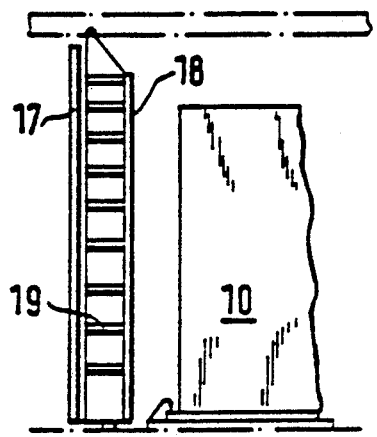
FIG. 3 shows a view similar to that of FIG. 1, but illustrating a different embodiment equipped with deformation or so-called crash struts.
Figure 5:
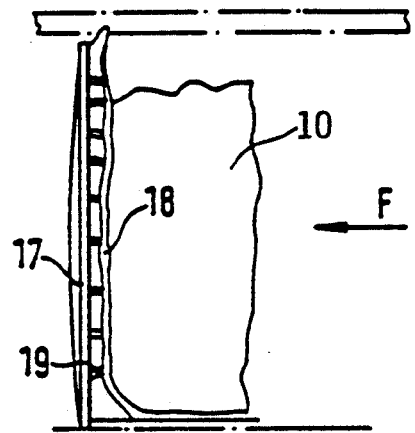
FIG. 5 is a view similar to that of FIG. 3, but showing the partition wall device in its buckled state after an impact.
Figure 4:
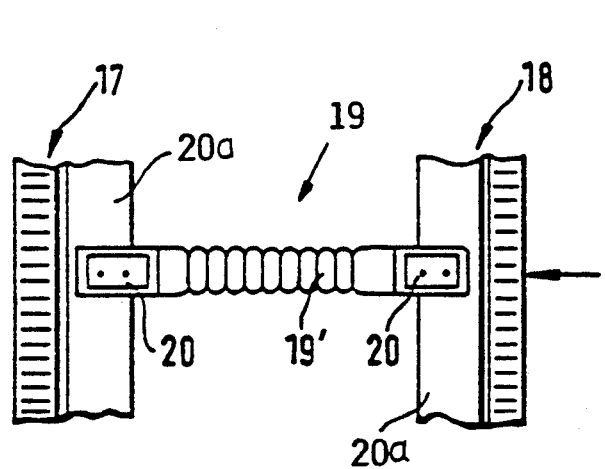
FIG. 4 is a view similar to that of FIG. 3, however, on an enlarged scale to illustrate an embodiment of a crash strut.
Figure 6:
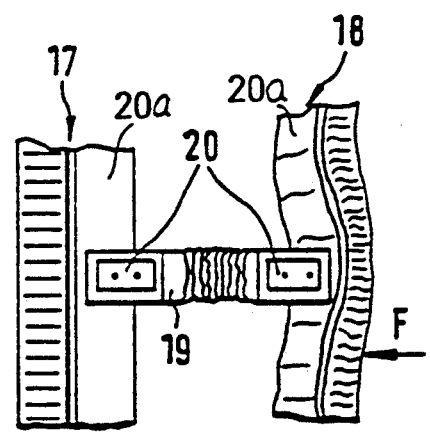
FIG. 6 is a view similar to that of FIG. 4, however again illustrating the crash strut after its compression or buckling.

FIG. 3 shows an embodiment in which a partition 18 constructed according to the invention is spaced from a further partition 17 which may be conventional or constructed as disclosed herein. Deformable struts 19 are located in the spacing between the partitions 17 and 18. Referring to FIG. 4, brackets 20 secure the deformable struts or buckling struts 19 to mounting elements 20a of the partitions 17 and 18. Each of the struts 19 comprises a corrugated tubular member 19' which is capable to take up energy when it is exposed to impacts effective longitudinally of the struts 19. FIG. 5 shows the situation after an impact. FIG. 6 illustrates the buckled condition of a strut 19. While buckling, the struts 19 take up at least a portion of the kinetic energy caused by the impact of the container 10 on the partition wall 18. The remaining kinetic energy is absorbed by the partition wall 18 itself.

Figure 7:
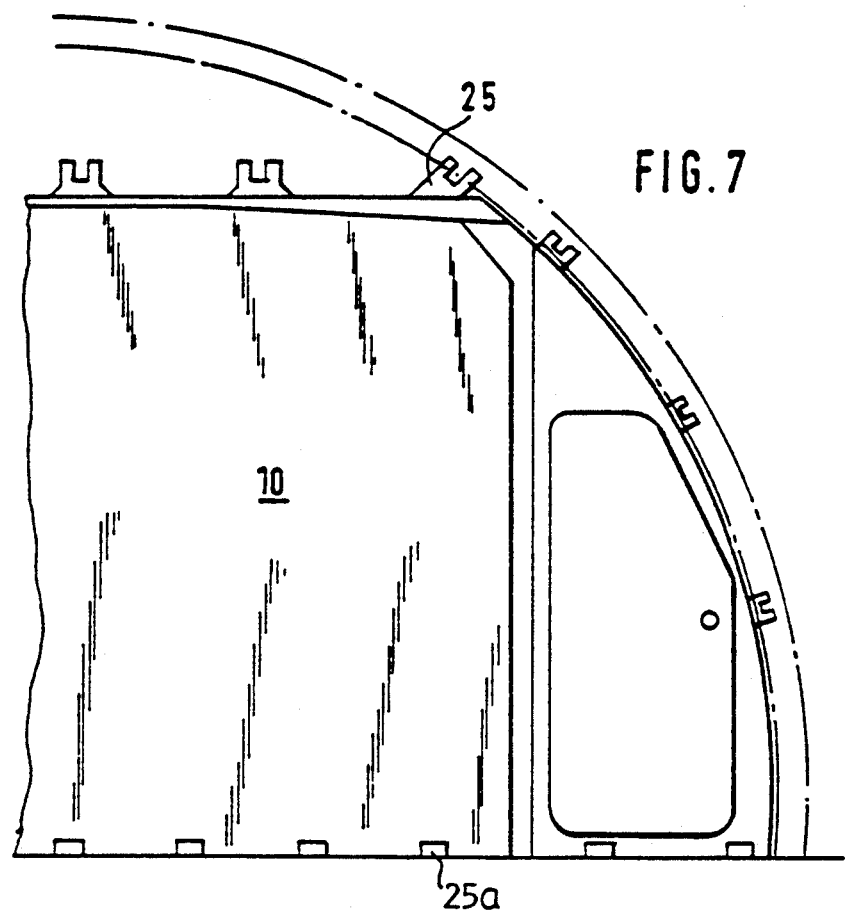
FIG. 7 is a view into an aircraft cabin as seen in the longitudinal axial direction, that is, in the flight direction for illustrating the hardware or means for securing the integral wall structure to the components of the aircraft cabin, for example, to the cabin ribs and to the floor.
Figure 13:
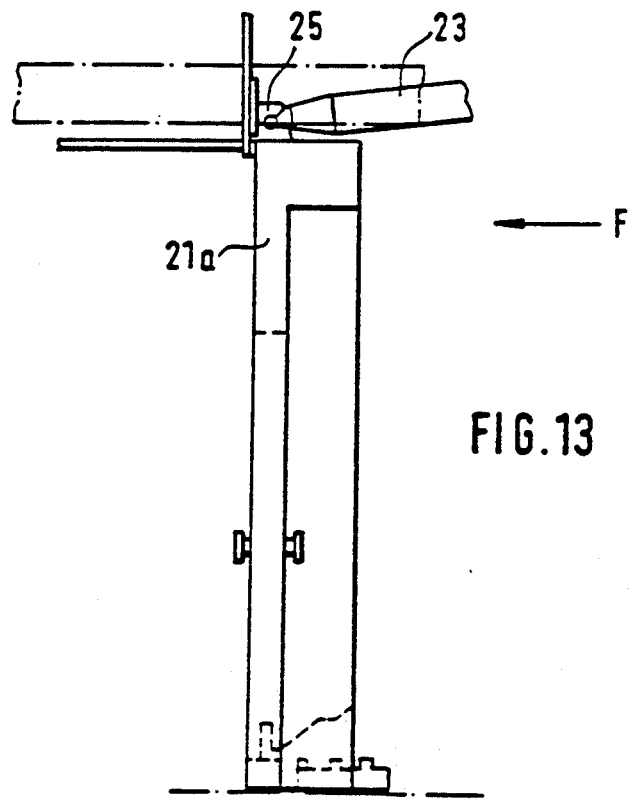
FIG. 13 is a side view of the present partition wall with brackets for securing the wall to the aircraft cabin structure by means of rods connected to the brackets and to the partition wall.

FIG. 7 shows a partition wall according to the invention installed in an aircraft body. The wall itself is secured by brackets 25 to the ceiling and by guide rails 25a to the floor of the passenger cabin.

FIG. 8 illustrates a partition wall 21 according to the invention secured by brackets 22 to the ceiling structure 6 and by a position adjustable bracket 29 to the floor 7. Dash-dotted lines 21a and 21b show the possibility of placing the partition 21 in different positions for enlarging or making smaller the cargo space. For this purpose the bracket 22 can remain in a fixed position and mounting rods 23, or 24 are employed for the repositining of the partition 21. The position adjustable mounting bracket 29 can then be reattached to the cabin floor at locations 21a or 21b. When a piece of cargo 10 impacts on the partition 21, the rod 23 would be subject to a tension load. On the other hand, the rod 24 would be subject to a compression load on impact. The connection of the rods 23, 24 to the partition 21 could be accomplished by brackets of the type shown at 25 in FIG. 7, for example.

As shown in FIGS. 9, 10, 11, and 12, a position adjustable mechanism can be embodied by different structures, each of which will cooperate with the floor rail 30 installed in the floor 7 of the aircraft cabin or of an aircraft freight space.

In the embodiment of FIG. 9, one or several rollers 31 ride along a guide rail 30 installed in the floor 7. A bracket 26 holds the roller 31 in the lower edge of the partition 21. The roller 31 may have an increased diameter central portion 31' for an improved guidance along the guide rail 30 which is equipped with a respective recessed channel.

FIG. 10 illustrates an embodiment in which a guide keel 32 is secured to the lower edge 27 of the partition 21. The guide keel 32 rides in a guide channel 33 of the guide rail 30.

FIG. 11 illustrates an embodiment in which the lower edge of the partition 21 has a recess 35. A position adjustable mechanism 28 is mounted by means of a bracket 34 in the recess 35. The mechanism 28 has a foot 28a riding in the guide channel 33 of the rail 30. When the nut 28b is loosened, the partition 21 may be displaced along the length of the rail, provided that the ceiling mounting is also released. In the new position the nut 28b is tightened again, whereby the lower end of the wall is rigidly secured to the floor.

FIG. 12 shows a combination of guide rollers 36 with guide keels 37 secured to a mounting bracket 29 having an upper arm 29a secured to the lower edge of the partition 21. The bracket 29 may also be equipped with the means shown in FIG. 11 for tightly or rigidly securing the partition 21 in an adjusted position. The guide means of FIGS. 9 and 10 may also be combined with the rigid securing and guide means of FIG. 11.

Figure 14:
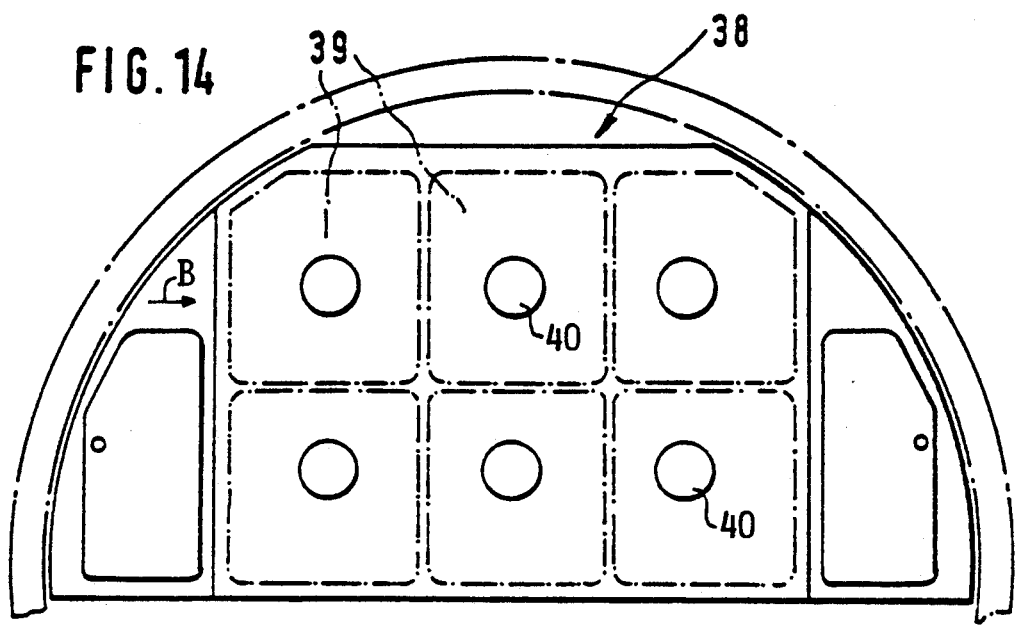
FIG. 14 shows a modified partition wall with airbags facing toward a cargo space.
Figure 15:
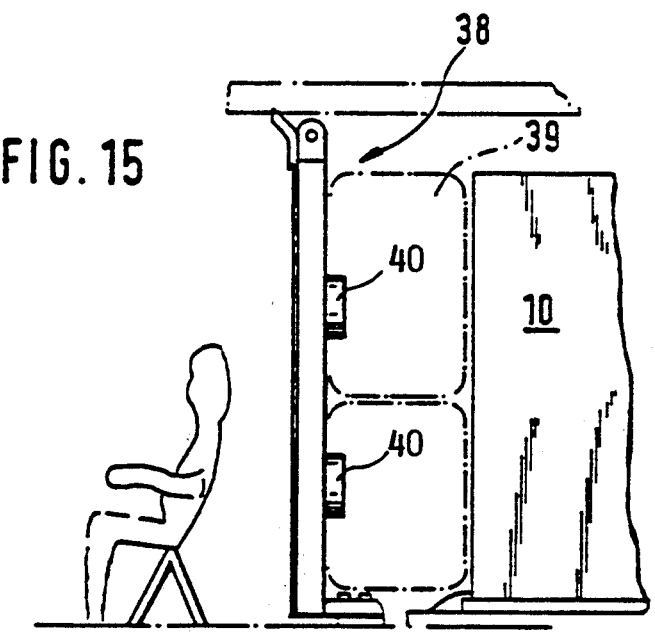
FIG. 15 is a side view in the direction of the arrow B in FIG. 14.

FIGS. 14 and 15 shown an embodiment in which the partition wall 38 constructed as described above is additionally equipped with airbag devices 39. Depending on the desired load take-up the number of airbags 39 and their distribution may be adjusted to particular types of loads. Acceleration sensors 40 responsive to a negative acceleration of the vehicle will cause the inflation of the airbags 39 in a conventional manner. The monitoring and controlling system for the inflation of the airbags is not part of the invention. However, singals from the respective acceleration sensor will activate a gas generator when a certain limit of a negative acceleration has been exceeded. Such airbag inflation can be activated in about 20 milliseconds and the airbags can be inflated in about 80 milliseconds, whereupon each airbag is capable to take up impact energy and converting such energy into compressive energy.

Incidentally, the surface of the partition facing the passenger cabin may be decorated, as desired.

Although the invention has been described with reference to specific example embodiments, it will be appreciated that it is intended to cover all modifications and equivalents within the scope of the appended claims.

What I claim is:

1. A device for separating in an aircraft body a cargo space from another space and for absorbing impact loads when a piece of cargo moving in a forward direction bumps into said device to retain said piece of cargo in said cargo space, comprising a rigid base wall for taking up impact loads, means for releasably and rigidly securing said single rigid base to said aircraft body, a protective shock absorbing wall section exclusively attached to said single rigid base wall on a side facing said cargo space in a direction opposite to said forward direction, said shock absorbing wall section comprising a plurality of energy absorbing layers arranged one behind the other in said forward direction, said energy absorbing layers facing said cargo, said energy absorbing layers and said single rigid base wall forming an integral structural unit.

2. The device of claim 1, wherein each of said energy absorbing layers of said shock absorbing wall section comprises rigid honeycomb panels (12, 13, 14) bonded to each other and to said rigid base wall, and wherein said shock absorbing wall section further comprises a metal ply of relatively low tensile strength bonded to a cargo facing surface of the respective rigid honey-comb panel to form a cover.

3. The device of claim 2, wherein at least one rigid honeycomb panel of said rigid honeycomb panels has honeycomb cells which have dimensions that differ from respective dimensions of honeycomb cells in other rigid honeycomb panels, whereby said at least one rigid honeycomb panel has a density different from the density of said other rigid honeycomb panels.

4. The device of claim 3, wherein each of said rigid honeycomb panels has different honeycomb cell dimensions, and wherein a panel with the largest cell dimensions faces said cargo, so that cell dimensions become progressively smaller toward said rigid base wall, whereby the panel density increases toward said rigid base wall.

5. The device of claim 1, wherein each of said energy absorbing layers of said shock absorbing wall section comprises a rigid honeycomb panel made of resin impregnated paper and fiber reinforced cover plies covering the respective rigid honeycomb panel so that said rigid honeycomb panels are sandwiched between said fiber reinforced cover plies to form a sandwich structure, and wherein said shock absorbing wall section further comprises an integral foam material block bonded to and covering a cargo facing side of said sandwich structure.

6. The device of claim 5, wherein said integral foam material block comprises layers of different density forming zones of different structural strengths and a closed uninterrupted surface cover, said zones including a first cargo facing zone having the least structural strength and a last zone having the largest structural strength next to said single rigid base wall, whereby the structural strength of said zones increases from said cargo facing side to said rigid base wall.

7. The device of claim 1, wherein said means for releasably and rigidly securing said base wall to said aircraft body comprise a fixed bracket (22) for securing said rigid base wall to a ceiling of said aircraft body, and position adjustable means (26, 27, 28, 29) for securing said rigid base wall to a rail (30) on the floor of said aircraft body.

8. The device of claim 7, wherein said position adjustable means (26) comprise a roller (31) operatively secured to said rigid base wall, said roller (31) being movably guided along said rail (30) on the floor of said aircraft body.

9. The device of claim 7, wherein said position adjustable means (27) comprise a sliding keel (32) operatively secured to said adjustable means secured to said rigid base wall, said sliding keel (32) being slideably guided along said rail (30) on the floor of said aircraft body.

10. The device of claim 7, wherein said position adjustable means (28) comprise a sliding element (34) operatively secured to said rigid base wall, said sliding element (34) being slideable along said rail (30) on the floor of said aircraft body.

11. The device of claim 7, wherein said position adjustable means comprise a mounting bracket (29) secured to said rigid base wall, a pair of rollers (36) mounted to said bracket (29) and a pair of sliding keels (37) mounted to said bracket, said pair of rollers (36) and said pair of sliding keels (37) being movable along said rail (30) on the floor of said aircraft body.

12. The device of claim 1, wherein said means for releasably and rigidly securing said rigid base wall to said aircraft body comprise brackets (25) secured with spacings from one another to said aircraft body, and support rods (23, 24) extending approximately horizontally and in the longitudinal direction of said aircraft body, each support rod having a first end secured to said aircraft body and a second end secured to said base wall.

13. The device of claim 1, wherein said rigid base wall (38) is made of fiber reinforced material, and wherein said shock absorbing wall section comprises at least one airbag secured to a cargo facing side of said base wall section, and acceleration sensor means arranged for activating said airbag in response to a defined negative acceleration.

* * * * *

UNITED STATES PATENT AND TRADEMARK OFFICE
CERTIFICATE OF CORRECTION

PATENT NO. : 5,085,382
DATED : February 4, 1992
INVENTOR(S) : Robert Finkbeiner

It is certified that error appears in the above-identified patent and that said Letters Patent is hereby corrected as shown below:

Title page:
Items [19] and [75] please change the inventor's name to read: Robert Finkbeiner.

In claim 1, line 5, column 5, line 68, after "a" insert --single--

In claim 13, line 5, column 8, line 12, replace "base wall section" by --rigid base wall--.

Signed and Sealed this

Thirteenth Day of April, 1993

Attest:

STEPHEN G. KUNIN

*Attesting Officer*          *Acting Commissioner of Patents and Trademarks*